US012738861B2

(12) United States Patent
Oshima et al.

(10) Patent No.: US 12,738,861 B2
(45) Date of Patent: Sep. 15, 2026

(54) POWER SOURCE DEVICE, IMAGE FORMING APPARATUS AND DEVICE

(71) Applicant: CANON KABUSHIKI KAISHA, Tokyo (JP)

(72) Inventors: Mitsunori Oshima, Shizuoka (JP); Hiromitsu Kumada, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/222,276

(22) Filed: May 29, 2025

(65) Prior Publication Data

US 2026/0039221 A1 Feb. 5, 2026

(30) Foreign Application Priority Data

Jul. 30, 2024 (JP) ................................ 2024-123753

(51) Int. Cl.
*H02M 7/217* (2006.01)
*G03G 15/00* (2006.01)
*H02M 1/14* (2006.01)

(52) U.S. Cl.
CPC ............ *H02M 7/217* (2013.01); *G03G 15/80* (2013.01); *H02M 1/143* (2013.01)

(58) Field of Classification Search
CPC ....... H02M 1/143; H02M 7/217; G03G 15/80
See application file for complete search history.

(56) References Cited

U.S. PATENT DOCUMENTS 6,560,127 B2 * 5/2003 Wittenbreder, Jr. ......................... H02M 3/33576 363/17
10,411,606 B2 * 9/2019 Oshima .................. H02M 1/32
11,514,283 B2 11/2022 Suzuki
11,709,457 B2 7/2023 Ichino
12,107,506 B2 10/2024 Oshima
12,199,498 B2 1/2025 Oshima
12,306,564 B2 5/2025 Oshima
2009/0059622 A1 * 3/2009 Shimada ................ H02M 1/32 363/17

(Continued)

FOREIGN PATENT DOCUMENTS

JP 2006-158137 A 6/2006
JP 2014-75943 A 4/2014

(Continued)

*Primary Examiner* — Rexford N Barnie
*Assistant Examiner* — Joseph N Inge
(74) *Attorney, Agent, or Firm* — VENABLE LLP

(57) ABSTRACT

A power source device of a full bridge system includes a rectifying circuit, a smoothing capacitor and a bridge circuit including first through forth switching elements. The first through forth switching elements are provided with first through fourth capacitors connected thereto in parallel, respectively. When combined capacitances of electrostatic capacitances between drain terminals and source terminals of the first through the fourth switching elements, respectively, and electrostatic capacitances of the first through the fourth capacitors are defined as first through fourth electrostatic capacitances, at least one value of electrostatic capacitance of the first through the fourth electrostatic capacitances is a value different from the other electrostatic capacitances.

10 Claims, 3 Drawing Sheets

(56) References Cited

U.S. PATENT DOCUMENTS

| | | | | |
|---|---|---|---|---|
| 2015/0102765 | A1* | 4/2015 | Lee | H02M 1/34 363/17 |
| 2016/0072390 | A1* | 3/2016 | Akutagawa | H02M 3/33507 363/17 |
| 2019/0326811 | A1* | 10/2019 | Li | H02M 3/33573 |
| 2022/0410738 | A1* | 12/2022 | Tashiro | B60L 53/20 |

FOREIGN PATENT DOCUMENTS

| | | | |
|---|---|---|---|
| JP | 6293242 | B1 | 3/2018 |
| JP | 2020-22299 | A | 2/2020 |

* cited by examiner

POWER SOURCE DEVICE, IMAGE FORMING APPARATUS AND DEVICE

BACKGROUND

Field of Technology

The present invention relates to a power source device, an image forming apparatus and an apparatus, and, for example, to noise reduction for a switching power source of a full bridge system.

Description of the Related Art

In a switching power source which supplies electric power to a load by switching a rectified and smoothed AC power source or a DC power source, in order to realize highly efficient electric power conversion, a switching power source of a full bridge system using a plurality of switching elements is used in some cases. In the switching power source of the full bridge system, by providing a capacitor in parallel with each switching element, electric power loss upon each switching element being turned off is reduced, and highly efficient operation is realized. Furthermore, in order to realize the highly efficient operation for a wide load range, a method in which an electrostatic capacitance between terminals of a switching element constituting an active leg is set larger than an electrostatic capacitance between terminals of a switching element constituting a passive leg has been proposed. (see, for example, Japanese Patent No. 6293242).

SUMMARY

Upon each switching element being turned off in the switching power source of the full bridge system, by capacitive components and inductive components of loads, electronic components and patterns resonating, voltage ringing occurs. This voltage ringing may, by propagating to an electric power source, become noise and affect other electronic equipment connected to the same electric power source. Therefore, there is a problem that it is necessary to provide a filter element between the switching power source of the full bridge system and an AC power source to reduce the noise, leading to an increase in size and price of a circuit.

The present invention is conceived under such a background, and can realize reducing noise propagated from a switching power source of a full bridge system to an electric power source and reduction in size and price of a circuit.

In order to solve the aforementioned problem, the present invention includes the following configurations.

(1) A power source device of a full bridge system comprising: a rectifying circuit configured to rectify an AC voltage of an AC power source; a smoothing capacitor connected to the rectifying circuit in parallel and configured to smooth the voltage rectified by the rectifying circuit; a first switching element; a second switching element connected to the first switching element in series; a third switching element; a fourth switching element connected to the third switching element in series; an inductor element of which one end is connected to a connecting point of the first switching element and the second switching element and of which the other end is connected to a connecting point of the third switching element and the fourth switching element; and a control portion configured to control a switching operation of the first switching element, the second switching element, the third switching element and the fourth switching element, wherein the first switching element and the second switching element which are connected in series are connected to the smoothing capacitor in parallel, and the third switching element and the fourth switching element which are connected in series are connected to the smoothing capacitor in parallel, and the power source device further comprising: a first capacitor connected to the first switching element in parallel; a second capacitor connected to the second switching element in parallel; a third capacitor connected to the third switching element in parallel; and a fourth capacitor connected to the fourth switching element in parallel, wherein when a combined capacitance of an electrostatic capacitance between a drain terminal and a source terminal of the first switching element and an electrostatic capacitance of the first capacitor is defined as a first electrostatic capacitance, a combined capacitance of an electrostatic capacitance between a drain terminal and a source terminal of the second switching element and an electrostatic capacitance of the second capacitor is defined as a second electrostatic capacitance, a combined capacitance of an electrostatic capacitance between a drain terminal and a source terminal of the third switching element and an electrostatic capacitance of the third capacitor is defined as a third electrostatic capacitance, and a combined capacitance of an electrostatic capacitance between a drain terminal and a source terminal of the fourth switching element and an electrostatic capacitance of the fourth capacitor is defined as a fourth electrostatic capacitance, at least one value of electrostatic capacitance of the first electrostatic capacitance, the second electrostatic capacitance, the third electrostatic capacitance and the fourth electrostatic capacitance is a value different from the other electrostatic capacitances.

(2) A power source device of a full bridge system comprising: a rectifying circuit configured to rectify an AC voltage of an AC power source; a smoothing capacitor connected to the rectifying circuit in parallel and configured to smooth the voltage rectified by the rectified circuit; a first switching element; a second switching element connected to the first switching element in series; a third switching element; a fourth switching element connected to the third switching element in series; an inductor element of which one end is connected to a connecting point of the first switching element and the second switching element and of which the other end is connected to a connecting point of the third switching element and the fourth switching element; and a control portion configured to control a switching operation of the first switching element, the second switching element, the third switching element and the fourth switching element, wherein the first switching element and the second switching element which are connected in series are connected to the smoothing capacitor in parallel, and the third switching element and the fourth switching element which are connected in series are connected to the smoothing capacitor in parallel, and wherein when an electrostatic capacitance between a drain terminal and a source terminal of the first switching element is defined as a first electrostatic capacitance, an electrostatic capacitance between a drain terminal and a source terminal of the second switching element is defined as a second electrostatic capacitance, an electrostatic capacitance between a drain terminal and a source terminal of the third switching element is defined as a third electrostatic capacitance, and an electrostatic capacitance between a drain terminal and a source terminal of the fourth switching element is defined as a fourth electrostatic capacitance, at least one value of electrostatic capacitance of the first electrostatic capacitance, the second electrostatic capacitance, the third electrostatic capacitance and the fourth electrostatic capacitance is a value different from those of the other electrostatic capacitances.

(3) An image forming apparatus for performing image formation on a recording material, the image forming apparatus comprising: a power source device according to (1) or (2).

(4) A device for consuming an electric power, the device comprising: a power source device according to (1) or (2).

Further features of the present invention will become apparent from the following description of exemplary embodiments with reference to the attached drawings.

DESCRIPTION OF THE EMBODIMENTS

Embodiment 1

[Switching Power Source]

Figure 1:
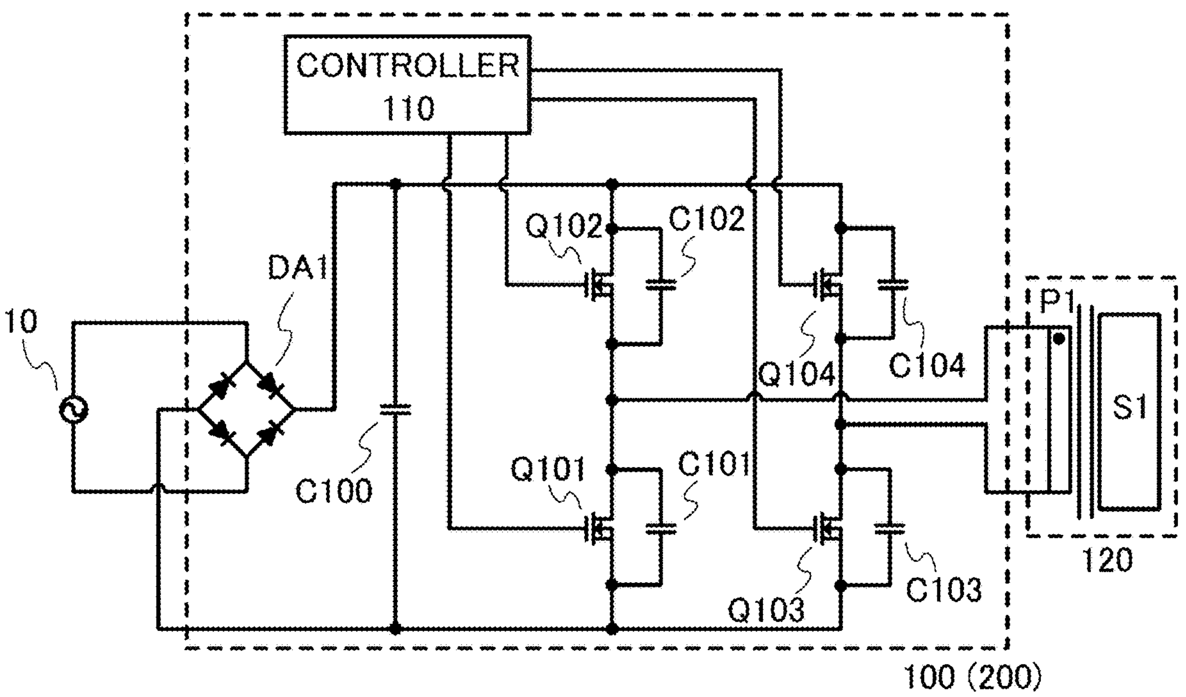
FIG. 1 is an outline view of a switching power source in Embodiments 1 through 3.

FIG. 1 is a view illustrating a switching power source as a power source device in an Embodiment 1. A switching power source 100 in the Embodiment 1 is a switching power source of a full bridge system which supplies an AC power of an arbitrary frequency to an insulated heated member S1. The switching power source 100 is characterized in that electrostatic capacitances between terminals of each switching element has different values for each switching element. Hereinafter, a circuit configuration of the switching power source 100 will be described, and then voltage ringing which occurs upon the switching elements being turned off will be described. Incidentally, on a primary side of the insulated heated member S1, a primary inductor P1 is provided, and the primary inductor P1 and the heated member S1 constitute a load 120.

The switching power source 100 includes a rectifying portion DA1, a smoothing capacitor C100, switching elements Q101, Q102, Q103 and Q104, capacitors C101, C102, C103 and C104, and a control portion 110. In more detail, the switching power source 100 includes a first switching element Q101, a second switching element Q102, a third switching element Q103 and a fourth switching element Q104. The first switching element Q101 through the fourth switching element Q104 are, for example, field effect transistors (hereinafter, referred to as FETs).

To the first switching element Q101, a first capacitor C101 is connected in parallel, i.e., between a drain terminal and a source terminal of the first switching element Q101, the first capacitor C101 is connected. To the second switching element Q102, a second capacitor C102 is connected in parallel, i.e., between a drain terminal and a source terminal of the second switching element Q102, the second capacitor C102 is connected. To the third switching element Q103, a third capacitor C103 is connected in parallel, i.e., between a drain terminal and a source terminal of the third switching element Q103, the third capacitor C103 is connected. To the fourth switching element Q104, a fourth capacitor C104 is connected in parallel, i.e., between a drain terminal and a source terminal of the fourth switching element Q104, the fourth capacitor C104 is connected. Incidentally, in the following description, "first" through "fourth" may be omitted.

In addition, the switching element Q101 and the switching element Q102 are connected in series, and the switching element Q103 and the switching element Q104 are connected in series. A connecting point between the switching element Q101 and the switching element Q102 is connected to one end of the primary inductor P1 (inductor element), and a connecting point between the switching element Q103 and the switching element Q104 is connected to the other end of the primary inductor P1. The switching element Q101 and the switching element Q102, which are connected in series, are connected in parallel to the smoothing capacitor C100 as a DC voltage source. In addition, the switching elements Q103 and the switching element Q104, which are connected in series, are also connected in parallel to the smoothing capacitor C100.

The switching power source 100 supplies electric power to the primary inductor P1 of the load 120 through switching operation of the switching element Q101 through switching element Q104. By this, it is possible for the switching power source 100 to heat the insulated heated member S1 with the AC power from an AC power source 10. The switching power source 100 adjusts the electric power supplied to the load 120 so that a temperature of the heated member S1 (control target) is constant. Incidentally, the temperature of the heated member S1 is detected by a temperature detecting means such as a thermistor, for example, and a detection result is input to the control portion 110 as a signal such as a voltage, and the control portion 110 may control the electric power to be supplied to the load 120 based on the input detection result.

Incidentally, in the Embodiment 1, the switching power source 100 is used as an ACAC inverter, however, the switching power source 100 may be used as a switching power source other than the ACAC inverter. As an example, by replacing the heated member S1 with a diode and a capacitor, and changing the control target to an output voltage, the switching power source 100 may be used as an ACDC converter. In addition, the switching power source 100 may be used as a DCAC inverter or a DCDC converter by removing the rectifying portion DA1 and using a DC power source instead of the AC power source 10.

The rectifying portion DA1 as a rectifying circuit is a diode bridge constituted by four diodes, and outputs a voltage, obtained by full-wave rectifying the AC voltage of the AC power source 10, to the smoothing capacitor C100. Incidentally, in the Embodiment 1, the rectifying portion DA1 is the diode bridge, however, a circuit which operates in a similar manner such as a power factor correction circuit (PFC) using a switching element such as an FET may be used. The smoothing capacitor C100 is a capacitor which is provided for smoothing an output of the rectifying portion DA1 or for preventing current, which is generated by the switching operation of the switching element Q101 through the switching element Q104, from flowing through the AC power source 10 and the rectifying portion DA1.

The switching elements Q101, Q102, Q103 and Q104 are FETs and form a full bridge circuit. To gate terminals of the switching elements Q101, Q102, Q103 and Q104, a control signal transmitted from the control portion 110 is input. By this, the switching element Q101 through the switching element Q104 are turned on or turned off by the control portion 110, and the electric power of an arbitrary frequency is supplied to the load 120 by phase shift control. The switching element Q101 and the switching element Q102 are turned on or off complementarily with a dead time in between, and are controlled so that on-times and off-times of both of the switching elements Q101 and Q102 are the same. Similarly, the switching element Q103 and the switching element Q104 are turned on or off complementarily with a dead time in between, and are controlled so that on-times and off-times of both of the switching elements Q103 and Q104 are the same.

In addition, the on-times and the off-times of the switching element Q101 through the switching element Q104 are the same value, and lengths of the dead times have a common value. Incidentally, in the Embodiment 1, the FETs are used for the switching element Q101 through the switching element Q104, however, instead, an insulated gate bipolar transistor (hereinafter, referred to as IGBT) may be used and a diode of reverse direction may be connected in parallel thereto. Since the IGBT, unlike the FET, does not have a parasitic diode, the diode of a reverse direction needs to be connected thereto externally. In this case, an anode terminal of the diode of the reverse direction is connected to an emitter terminal of the IGBT, and a cathode terminal of the diode of the reverse direction is connected to a collector terminal of the IGBT.

In addition, in the Embodiment 1, for the switching element Q101 through the switching element Q104, an element of all the same type is used, and electrostatic capacitances between the drain terminal and the source terminal thereof all have the same value. Incidentally, for the switching element Q101 through the switching element Q104, different types of the switching elements with different electrostatic capacitances between a drain terminal and a source terminal thereof may be used, respectively. An effect of using the different types of the switching elements with the different electrostatic capacitances between the drain terminal and the source terminal thereof will be described below.

The capacitors C101, C102, C103 and C104 are capacitors, of which change in the electrostatic capacitance by change in a frequency is small, such as a ceramic capacitor and a film capacitor. The capacitors C101, C102, C103 and C104 are connected between the drain terminal and the source terminal of the switching elements Q101, Q102, Q103, and Q104, respectively. By the capacitor C101 through the capacitor C104 being connected, the electrostatic capacitance between the drain terminal and the source terminal of each switching element is increased. By this, increase of a voltage between the drain terminal and the source terminal upon each switching element being turned off becomes gradual, and an electric power loss upon the turn off is reduced. In addition, by the capacitor C101 through the capacitor C104 being connected, a frequency of the voltage ringing which occurs upon each switching element being turned off changes. In the Embodiment 1, the capacitor C101 through the capacitor C104 have different electrostatic capacitances, and the frequencies of the voltage ringing upon the turn off also have different values for each switching element. Details of a relationship between the voltage ringing upon the switching element Q101 through the switching element Q104 being turned off and the electrostatic capacitances of the capacitor C101 through the capacitor C104 will be described below using FIG. 2.

(On Electrostatic Capacitance)

The electrostatic capacitance between the drain terminal and the source terminal of the switching element Q101 is defined as follows. The switching element Q101 itself has an electrostatic capacitance between the drain terminal and the source terminal thereof. Here, as shown in FIG. 1, there is a case in which the capacitor C101 is connected in parallel to the switching element Q101, and a case in which the capacitor is not connected to the switching element Q101. In the case in which the capacitor C101 is connected, the electrostatic capacitance between the drain terminal and the source terminal becomes an electrostatic capacitance combining the electrostatic capacitance of the switching element Q101 itself and the electrostatic capacitance of the capacitor C101 (hereinafter, referred to as a combined capacitance). On the other hand, in the case in which the capacitor C101 is not connected, the electrostatic capacitance between the drain terminal and the source terminal is only the electrostatic capacitance of the switching element Q101 itself. The same is true for the switching elements Q102 through Q104 and the capacitors C102 through C104.

The electrostatic capacitance between the drain terminal and the source terminal of the switching element Q101 is defined as CQ101 as a first electrostatic capacitance. If the capacitor C101 is connected, the electrostatic capacitance CQ101 becomes a value combining the electrostatic capacitance of the switching element Q101 itself and the electrostatic capacitance of the capacitor C101. If the capacitor C101 is not connected, the electrostatic capacitance CQ101 is the electrostatic capacitance of the switching element Q101 itself. Hereinafter, for the electrostatic capacitances between the drain terminal and the source terminal of the switching elements Q102 through Q104, CQ102 as a second electrostatic capacitance, CQ103 as a third electrostatic capacitance, and CQ104 as a fourth electrostatic capacitance are defined in the same manner.

In the Embodiment 1 shown in FIG. 1, the electrostatic capacitances between the drain terminal and source terminal of the switching elements Q101 through Q104 themselves have substantially the same value as described above. Therefore, a magnitude relationship among the electrostatic capacitances CQ101 through CQ104 depends on a magnitude relationship of the electrostatic capacitances of the capacitors C101 through C104. Here, the term "substantially the same" includes a case of being exactly the same and a case of being different within an allowable range including errors caused by variations upon the switching elements of the same production type being manufactured.

Here, in a case in which the electrostatic capacitances CQ101 through CQ104 are all set to the same value, the frequencies of the voltage ringings which occur upon each switching element being turned off will have substantially the same value for all of the switching elements. In this case, in a spectrum in which a horizontal axis represents a frequency and a vertical axis represents an intensity of noise, the intensity has a local maximum at one frequency.

In contrast, in the Embodiment 1, it is set so that at least one value of the electrostatic capacitance of the electrostatic capacitances CQ101, CQ102, CQ103 and CQ104 is a value different from the other electrostatic capacitances. For example, in the Embodiment 1, by configuring that the electrostatic capacitances of the four capacitors C101 through C104 have all different values, the frequencies of the generated voltage ringings are dispersed so as to have four local maximum values in the spectrum. By this, it becomes possible to make peak values of each local maximum value lower than the case having the single local maximum value.

As such, the electrostatic capacitances of the capacitors C101 through C104 may be set to all different values. There is no limitation in particular on an order of the magnitude relationship among these values of the four electrostatic capacitances. For example, in the Embodiment 1, the electrostatic capacitances of each capacitor C101 through C104 are set to be in a relationship of the following inequality (1).

$$C103 > C101 > C102 > C104 \tag{1}$$

Figure 2:
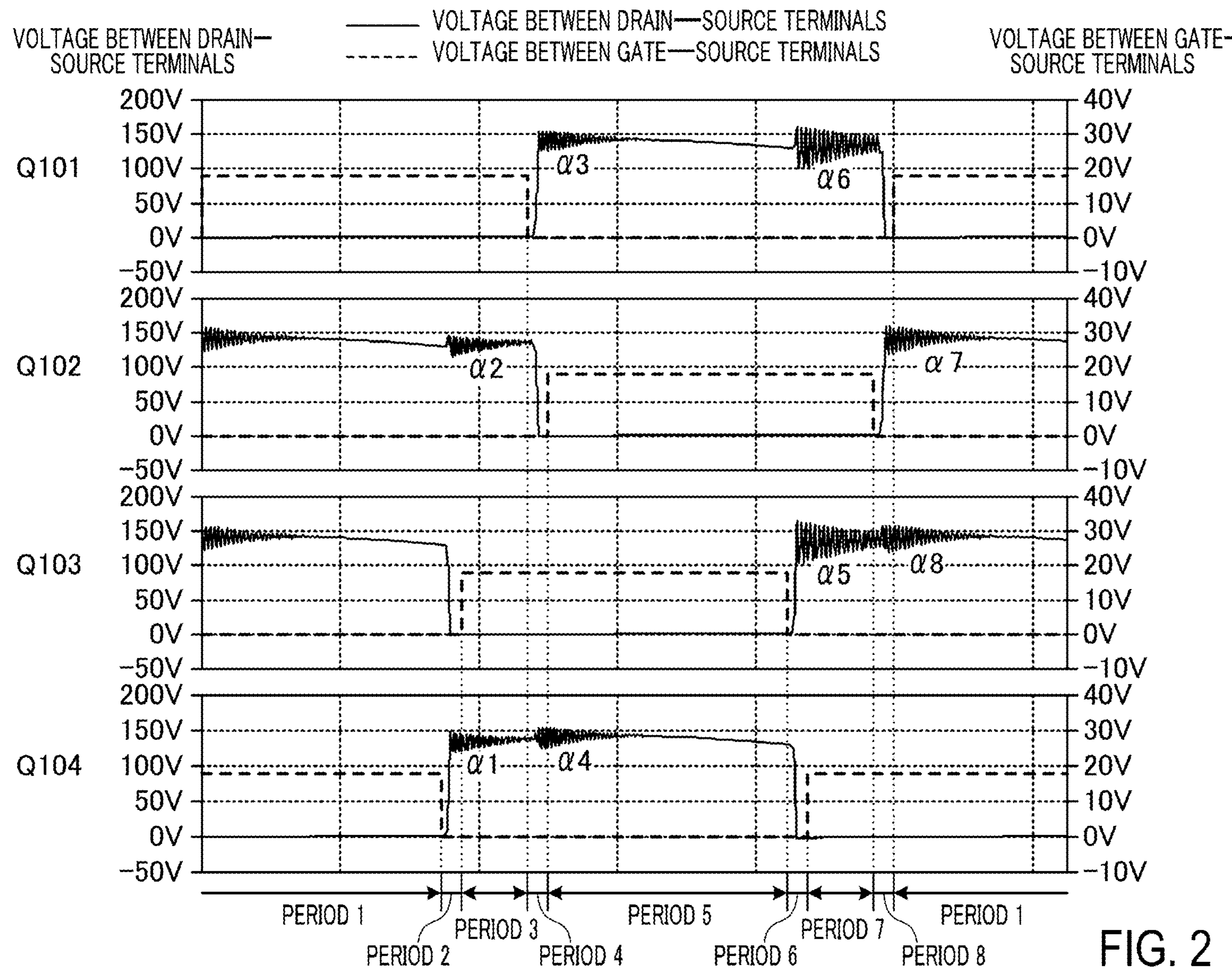
FIG. 2 is an outline view of operating waveforms of the switching power source in the Embodiment 1.

This is a relationship, in a circuit for generating the voltage ringing as shown in FIG. 2, which will be described below, set by focusing on an amplitude of the voltage ringing generated by the turn off of each switching element. The amplitude of the voltage ringing depends on several factors and varies depending on circuit configurations, however, as the amplitude becomes large, by setting the electrostatic capacitance between the drain terminal and the source terminal of the switching element to a larger value, it becomes more effective to disperse the frequency of the voltage ringings.

Incidentally, it may be configured that, without connecting the capacitors in parallel to the switching elements, but by making the electrostatic capacitances between the drain terminal and source terminal of the four switching elements themselves have all different values, the frequencies of the voltage ringing which occurs are made to be different. In addition, it may be configured that, by making the electrostatic capacitances between the drain terminal and the source terminal of the four switching elements themselves have all different values, and further connecting the capacitors in parallel to each switching element, the electrostatic capacitances CQ101 through CQ104 are made to be all different. In this case, there is no limitation also on the order of the magnitude relationship of the electrostatic capacitances CQ101 through CQ104 in particular, however, as an example, the magnitude relationship may be set in the same order (CQ103>CQ101>CQ102>CQ104) as in the inequality (1) described above.

The control portion 110 is a circuit which controls switching states of the switching element Q101 through the switching element Q104. The control portion 110 controls frequencies (switching frequencies) and phase shift amounts of the switching element Q101 through the switching element Q104 based on the temperature of the heated member S1. The control portion 110 controls the output electric power through the phase shift control, which shifts phases of on/off of the switching element Q101 and the switching element Q102 and phases of on/off of the switching element Q103 and the switching element Q104. Incidentally, in a period of "on" of the switching element Q101, the switching element Q102 is turned off, and in a period of "on" of the switching element Q103, the switching element Q104 is turned off.

When the phase shift amount is 0 rad (radian), the switching element Q101 and the switching element Q103 are turned on or off at the same time, and the switching element Q102 and the switching element Q104 are turned on or off at the same time. When the phase shift amount is 0 rad, the switching element Q101 and the switching element Q104, and the switching element Q102 and the switching element Q103 are not turned on at the same time, so that no current flows to the load 120 and the output electric power of the switching power source 100 becomes 0 W.

As the phase shift amount is increased from 0 rad, a period when the switching element Q101 and the switching element Q104 are turned on at the same time and a period when the switching element Q102 and the switching element Q103 are turned on at the same time increase (become longer), respectively. Therefore, the output electric power of the switching power source 100 also increases. The output electric power of the switching power source 100 becomes a maximum when the phase shift amount is 71 rad. Incidentally, as an example, a maximum value of the output electric power of the switching power source 100 in the Embodiment 1 is 1000 W or more.

The load 120 is constituted by the primary inductor P1 and the heated member S1 on a secondary side. The primary inductor P1 and the heated member S1 on the secondary side are magnetically connected, and the heated member S1 is supplied with the electric power by the switching operation of the switching element Q101 through the switching element Q104 via the primary inductor P1. When the electric power is supplied from the primary inductor P1, current flows through the heated member S1, and the heated member S1 is heated by Joule heat due to electrical resistance of the heated member S1 itself. Incidentally, in the Embodiment 1, the load 120 which is divided into the primary side and the secondary side is used, however, depending on safety design of a device for which the switching power source 100 is used, the configuration corresponding to reinforced insulation or double insulation under safety standards is not necessary between the primary inductor P1 and the heated member S1.

[Voltage and Current During Switching Operation]

Next, voltage and current upon the switching element Q101 through the switching element Q104 performing the switching operation will be described using FIG. 2. FIG. 2 is a view in which a horizontal axis represents time, voltages between the gate terminal and the source terminal of each switching element Q101, Q102, Q103 and Q104 are shown as broken lines, and voltages between the drain terminal and the source terminal thereof are shown as solid lines, respectively.

In FIG. 2, the control portion 110 controls the switching operation of the switching element Q101 through the switching element Q104 at the frequency of 50 kHz, the phase shift amount of 0.75π rad and a dead time of 600 ns. Each switching element is turned on when the voltage between the gate terminal and the source terminal reaches an H (high) level (20 V), and is turned off when the voltage reaches an L (low) level (0 V). The operation of the switching power source 100 in one cycle may be divided into a period 1 through a period 8 with times when each switching element is turned on or turned off as boundaries. Hereinafter, the voltages between the drain terminal and the source terminal of each switching element and current flowing through each element of the switching power source 100 will be described in chronological order from the period 1.

(Period 1)

The period 1 is a period during which the switching element Q101 and the switching element Q104 are on at the same time. During the period 1, the voltages between the drain terminal and the source terminal of the switching element Q101 and of the switching element Q104 are approximately 0 V. Therefore, current flows through a path of the smoothing capacitor C100, the switching element Q104, the primary inductor P1 and the switching element Q101.

(Period 2)

The period 2 is a period during which the switching element Q104 is turned off and only the switching element Q101 is on. During the period 2, the voltage between the drain terminal and the source terminal of the switching element Q101 remains at about 0 V. On the other hand, due to energy stored in the primary inductor P1 during the period 1, current flows through a path of the primary inductor P1, the switching element Q101, the smoothing capacitor C100 and the capacitor C104. By this, the capacitor C104 is electrically charged, and the voltage between the drain terminal and the source terminal of the switching element Q104 gradually rises.

In addition, when the switching element Q104 is turned OFF, current flows also through a path of the capacitor C103, the primary inductor P1 and the switching element Q101. As a result, the capacitor C103 is electrically discharged, and the voltage between the drain terminal and the source terminal of the switching element Q103 gradually decreases. When the voltage between the drain terminal and the source terminal decreases to a voltage at which a body diode of the switching element Q103 becomes conductive, current flows through a path of the primary inductor P1, the switching element Q101, and the body diode of the switching element Q103.

When the voltage between the drain terminal and the source terminal of the switching element Q104 becomes approximately equal to the voltage of the smoothing capacitor C100 (about 140 V), resonance occurs. In detail, due to the electrostatic capacitances, an inductance, and resistance components of the smoothing capacitor C100, the capacitor C102, the switching element Q102, the capacitor C104, the switching element Q104, the primary inductor P1, the patterns, etc., the resonance occurs. Due to this resonance, the voltages between the drain terminal and the source terminal of the switching element Q102 and the switching element Q104 oscillate with the voltage of the smoothing capacitor C100 as a center at a frequency depending on the capacitor C102 and the capacitor C104. In other words, by the switching element Q104 being turned off, the voltage ringing occurs between the drain terminal and the source terminal of the switching element Q102 and of the switching element Q104.

(Period 3)

The period 3 is a period during which the switching element Q103 is turned on and the switching element Q101 and the switching element Q103 are on at the same time. During the period 3, the voltages between the drain terminal and the source terminal of the switching element Q101 and the switching element Q103 are about 0 V. In addition, due to the energy stored in the primary inductor P1 during the period 1, current flows through a path of the primary inductor P1, the switching element Q101 and the switching element Q103. Incidentally, also during the period 3, the voltages between the drain terminal and the source terminal of the switching element Q102 and the switching element Q104 continues to oscillate, however, an amplitude thereof gradually decreases due to a resistance component of the resonance.

(Period 4)

The period 4 is a period during which the switching element Q101 is turned off and only the switching element Q103 is ON. During the period 4, the voltage between the drain terminal and the source terminal of the switching element Q103 remains at about 0 V. On the other hand, due to the energy stored in the primary inductor P1 during the period 1, current flows through a path of the primary inductor P1, the capacitor C101 and the switching element Q103. By this, the capacitor C101 is electrically charged, and the voltage between the drain terminal and the source terminal of the switching element Q101 gradually rises.

As the voltage between the drain terminal and the source terminal of the switching element Q101 rises, the voltage between the drain terminal and the source terminal of the switching element Q102 decreases, and decreases until the body diode of the switching element Q102 becomes conductive. Incidentally, the capacitor C102 is electrically discharged. Then current flows through a path of the primary inductor P1, the body diode of the switching element Q102, the smoothing capacitor C100 and the switching element Q103. When the voltage between the drain terminal and the source terminal of the switching element Q101 becomes approximately equal to the voltage of the smoothing capacitor C100, resonance occurs. In detail, due to the electrostatic capacitances, the inductance, and resistance components of the smoothing capacitor C100, the capacitor C101, the switching element Q101, the capacitor C104, the switching element Q104, the primary inductor P1, the patterns, etc., the resonance occurs. Due to this resonance, the voltages between the drain terminal and the source terminal of the switching element Q101 and the switching element Q104 oscillate with the voltage of the smoothing capacitor C100 as a center at a frequency depending on the capacitor C101 and the capacitor C104. In other words, by the switching element Q101 being turned off, the voltage ringing occurs between the drain terminal and the source terminal of the switching element Q101 and of the switching element Q104.

(Period 5)

The period 5 is a period during which the switching element Q102 is turned on, and the switching element Q102 and the switching element Q103 are on at the same time. During the period 5, the voltages between the drain terminal and the source terminal of the switching element Q102 and of the switching element Q103 become approximately 0 V, and current flows through a path of the primary inductor P1, the switching element Q102, the smoothing capacitor C100 and the switching element Q103. During the period 5, due to the resonance between the primary inductor P1 and the smoothing capacitor C100, a direction of the current is reversed, and the current flows in a direction of the smoothing capacitor C100, the switching element Q102, the primary inductor P1 and the switching element Q103. Incidentally, also during the period 5, the voltages between the drain terminal and the source terminal of the switching element Q101 and the switching element Q104 continue to oscillate, however, an amplitude thereof gradually decreases due to the resistance component of the resonance.

(Period 6)

The period 6 is a period during which the switching element Q103 is turned off and only the switching element Q102 is on. During the period 6, the voltage between the drain terminal and the source terminal of the switching element Q102 remains at about 0 V. On the other hand, due to energy stored in the primary inductor P1 during the period 5, current flows through a path of the primary inductor P1, the capacitor C103, the smoothing capacitor C100 and the switching element Q102. By this, the capacitor C103 is electrically charged, and the voltage between the drain terminal and the source terminal of the switching element Q103 gradually rises.

As the voltage between the drain terminal and the source terminal of the switching element Q103 rises, the voltage between the drain terminal and the source terminal of the switching element Q104 decreases. Incidentally, the capacitor C014 is electrically discharged. When the voltage between the drain terminal and the source terminal decreases to a voltage at which a body diode of the switching element Q104 becomes conductive, current flows through a path of the primary inductor P1, the switching element Q104, the body diode of the switching element Q104, and the switching element Q102. When the voltage between the drain terminal and the source terminal of the switching element Q103 becomes approximately equal to the voltage of the smoothing capacitor C100, resonance occurs. In detail, due to the electrostatic capacitances, the inductance, and the resistance components of the smoothing capacitor C100, the capacitor C101, the switching element Q101, the capacitor C103, the switching element Q103, the primary inductor P1, the patterns, etc., the resonance occurs. Due to this resonance, the voltages between the drain terminal and the source terminal of the switching element Q101 and the switching element Q103 oscillate with the voltage of the smoothing capacitor C100 as a center at a frequency depending on the capacitor C101 and the capacitor C103. In other words, by the switching element Q103 being turned off, the voltage ringing occurs between the drain terminal and the source terminal of the switching element Q101 and of the switching element Q103.

(Period 7)

The period 7 is a period during which the switching element Q104 is turned on and the switching element Q102 and the switching element Q104 are ON at the same time. During the period 7, the voltages between the drain terminal and the source terminal of the switching element Q102 and the switching element Q104 become about 0 V. In addition, due to the energy stored in the primary inductor P1 during the period 5, current flows through a path of the primary inductor P1, the switching element Q104 and the switching element Q102. Incidentally, also during the period 7, the voltages between the drain terminal and the source terminal of the switching element Q101 and the switching element Q103 continue to oscillate, however, an amplitude thereof gradually decreases due to the resistance component of the resonance.

(Period 8)

The period 8 is a period during which the switching element Q102 is turned off and only the switching element Q104 is on. During the period 8, the voltage between the drain terminal and the source terminal of the switching element Q104 remains at about 0 V. On the other hand, due to the energy stored in the primary inductor P1 during the period 5, current flows through a path of the primary inductor P1, the switching element Q104 and the capacitor C102. By this, the capacitor C102 is electrically charged, and the voltage between the drain terminal and the source terminal of the switching element Q102 gradually rises. In addition, when the switching element Q102 is turned off, current flows also through a path of the capacitor C101, the primary inductor P1, the switching element Q104 and the smoothing capacitor C100. As a result, the voltage between the drain terminal and the source terminal of the switching element Q101 gradually decreases. Incidentally, the capacitor C101 is electrically discharged.

When the voltage between the drain terminal and the source terminal of the switching element Q101 decreases to a voltage at which a body diode of the switching element Q101 becomes conductive, current flows through the following path. That is, the current flows through a path of the primary inductor P1, the switching element Q104, the smoothing capacitor C100 and the body diode of the switching element Q101. When the voltage between the drain terminal and the source terminal of the switching element Q102 becomes approximately equal to the voltage of the smoothing capacitor C100, resonance occurs. In detail, due to the electrostatic capacitances, the inductance, and the resistance components of the smoothing capacitor C100, the capacitor C102, the switching element Q102, the capacitor C103, the switching element Q103, the primary inductor P1, the patterns, etc., the resonance occurs. Due to this resonance, the voltages between the drain terminal and the source terminal of the switching element Q102 and the switching element Q103 oscillate with the voltage of the smoothing capacitor C100 as a center at a frequency depending on the capacitor C102 and the capacitor C103. In other words, by the switching element Q102 being turned off, the voltage ringing occurs between the drain terminal and the source terminal of the switching element Q102 and of the switching element Q103. After the period 8 ends, by the switching element Q101 being turned off, the cycle is returned to the period 1.

As described above, the frequency of the voltage ringing, which occurs upon each switching element being turned off, is determined depending on those corresponding of electrostatic capacitance of each capacitor. The voltage ringing and corresponding capacitors are summarized in Table 1. For example, in the case in which the switching element turned off is the switching element Q101, the electrostatic capacitances which affect the frequency of the voltage ringing to occur are the electrostatic capacitances of the capacitor C101 and of the capacitor C104.

TABLE 1

| Switching element turned off | Electrostatic capacitance(s) affecting frequency of voltage ringing to occur |
|---|---|
| Q101 | C101 and C104 |
| Q102 | C102 and C103 |
| Q103 | C101 and C103 |
| Q104 | C102 and C104 |

In FIG. 2, to the voltage ringings which occurred due to the turn off of each switching element, reference signs from α1 to α8 are attached. An oscillation of α1 is caused by the turn off of the switching element Q104, and according to Table 1, the frequency thereof depends on the electrostatic capacitances of the capacitor C102 and of the capacitor C104 (period 2). Since an oscillation of α2 is also caused by the turn off of the switching element Q104, the frequency thereof has the same value as the oscillation of α1 (period 2). An oscillation of α3 is caused by the turn off of the switching element Q101, and according to Table 1, the frequency thereof depends on the electrostatic capacitances of the capacitor C101 and of the capacitor C104 (period 4). Since an oscillation of α4 is also caused by the turn off of the switching element Q101, the frequency thereof has the same value as the oscillation of α3 (period 4). An oscillation of α5 is caused by the turn off of the switching element Q103, and according to Table 1, the frequency thereof depends on the electrostatic capacitances of the capacitor C101 and of the capacitor C103 (period 6). Since an oscillation of α6 is also caused by the turn off of the switching element Q103, the frequency thereof has the same value as the oscillation of α5 (period 6). An oscillation of α7 is caused by the turn off of the switching element Q102, and according to Table 1, the frequency thereof depends on the electrostatic capacitances of the capacitor C102 and of the capacitor C103 (period 8). Since an oscillation of $\alpha 8$ is also caused by the turn off of the switching element Q102, the frequency thereof has the same value as the oscillation of $\alpha 7$ (period 8).

[Reason for Making the Electrostatic Capacitances Different]

Next, a reason why making the electrostatic capacitances of the capacitor C101 through the capacitor C104 different will be described. The reason why making the electrostatic capacitances of the capacitors C101 through C104, which are provided in parallel with the switching elements Q101 through Q104, in the switching power source 100 different is to reduce noise propagating to the AC power source 10 and to realize reduction in size and price of the circuit.

As described in FIG. 2, in the switching power source 100 of the full bridge system, the voltage ringing occurs between the terminals of the switching element upon the switching element is turned off. If the voltage ringing propagates to the AC power source 10 through a parasitic component of the rectifying portion and/or stray capacitance between the patterns, it may become noise for and affect a device, which is connected to the same AC power source 10. Therefore, it is necessary that the voltage ringing which occurs upon the turn off of the switching element is reduced as much as possible before propagating to the AC power source 10.

As a common method for reducing the noise propagating from the switching power source 100 to the AC power source 10, there is a method in which a filter element such as a choke coil and an across-the-line capacitor is provided between the AC power source 10 and the switching power source 100. However, in a case in which the noise propagating from the switching power source 100 to the AC power source 10 is reduced by the filter element, upon attempting to enhance noise reduction effect, it is necessary to use a larger and more expensive filter element or to increase a number of filter elements. In addition, in general, the larger the output electric power of a switching power source, the greater a noise which occurs from the switching power source. Therefore, upon attempting to provide a countermeasure for the noise only with the filter element in the switching power source, which has a large output electric power, as the switching power source 100, it may result in increasing in size and price of the switching power source itself.

Therefore, in the Embodiment 1, by making the electrostatic capacitances of the capacitors, which are provided in parallel with the switching elements, have different values for each switching element, the frequencies of the voltage ringings which occur upon the turn off are changed and the noise propagating to the AC power source 10 is reduced. Incidentally, strictly speaking, the frequency of the voltage ringing which occurs upon each switching element being turned off depends on the combined electrostatic capacitance of the electrostatic capacitance of the capacitor and the electrostatic capacitance between the terminals of the switching element itself. In addition, since there are tolerances in the electrostatic capacitance between the terminals of the switching element itself and the electrostatic capacitance of the capacitor, even when the same type of element is used, the electrostatic capacitance between the terminals of the switching element itself varies among individual components. Therefore, even when the same type of element is used for all of each switching element, and the same type of element is used for all of each capacitor, it is highly likely that the electrostatic capacitances between the terminals of each switching element itself have all different values. However, in a case in which the electrostatic capacitances between the terminals of the switching elements themselves are made to be different by the tolerances of the component, the differences of the electrostatic capacitances are small, so that noise reduction effect thereof is decreased.

Therefore, upon making the electrostatic capacitances between the terminals of the switching elements themselves have different values for each switching element, it is desirable that the capacitors with different nominal values of the electrostatic capacitance be provided in parallel with the switching elements. However, it is possible to change the frequency of the voltage ringing upon the turn off of the switching element by means other than changing the electrostatic capacitances of the capacitors provided in parallel, such as by using the switching element of a different type which has a significantly different electrostatic capacitance between the terminals thereof.

[On the Frequency of the Voltage Ringing and the Noise]

Next, a reason why by changing the frequencies of the voltage ringings which occur upon the switching elements being turned off, the noise propagating to the AC power source is reduced will be described. As described in FIG. 2 and Table 1, the frequency of voltage ringing which occurs upon each switching element being turned off is determined by the electrostatic capacitance between the drain terminal and the source terminal of each switching element in the state in which the capacitor is connected thereto. Therefore, as in a typical switching power source of the full bridge system, in a case in which the used switching elements are all the same type and the electrostatic capacitances of the capacitors provided in parallel with the switching elements are also all the same, the voltage ringings upon the turn off have approximately the same frequency. Therefore, in a case in which the typical switching power source of the full bridge system is connected to an AC power source and used, by noises, which occur upon each switching element being turned off, strengthening each other, a spectrum of the noise propagating to the AC power source has a high intensity at a specific frequency.

On the other hand, with the switching power source 100 in the Embodiment 1, the electrostatic capacitances between the drain terminal and the source terminal of each switching element have all different values, for example, as shown in the inequality (1). Therefore, the frequencies of the voltage ringings which occur upon each switching element being turned off are all different values. Therefore, in the switching power source 100, the spectrum of the noise propagating to the AC power source 10 has local maximum values at four frequencies, however, it becomes possible to suppress the maximum intensities lower than the case using the typical switching power source of the full bridge system. Therefore, for the switching power source 100, smaller and less expensive filter elements than those for the typical switching power source of the full bridge system can be used.

As an example, assume that in the switching power source 100, the electrostatic capacitance of the capacitor C101 is 5600 pF, the electrostatic capacitance of the capacitor C102 is 3900 pF, the electrostatic capacitance of the capacitor C103 is 6800 pF, and the electrostatic capacitance of the capacitor C104 is 2200 pF. In this specific example, the electrostatic capacitances of each capacitor satisfies the relationship in the inequality (1). Then the frequencies of the voltage ringings upon the turn off of each switching element become as in Table 2. From Table 2, it is found that, in the switching power source 100, the frequencies of the voltage ringings upon the turn off are different among all of the switching elements. This means that the local maximum values in the spectrum of the noise propagating to the AC power source 10 are dispersed into four.

TABLE 2

| Switching element | Electrostatic capacitance of capacitor provided in parallel | Frequency of voltage ringing which occurs upon turn off |
|---|---|---|
| Q101 | 5600 pF | 9.64 MHz |
| Q102 | 3900 pF | 8.20 MHz |
| Q103 | 6800 pF | 7.66 MHz |
| Q104 | 2200 pF | 10.63 MHz |

For example, applying Table 1 and Table 2 to FIG. 2, when the switching element Q101 is turned off, the frequency of the oscillations of $\alpha 3$ and $\alpha 4$ becomes 9.64 MHz. In addition, when the switching element Q102 is turned off, the frequency of the oscillations of $\alpha 7$ and $\alpha 8$ becomes 8.20 MHz. In addition, when the switching element Q103 is turned off, the frequency of the oscillations of $\alpha 5$ and $\alpha 6$ becomes 7.66 MHz. Furthermore, when the switching element Q104 is turned off, the frequency of the oscillations of $\alpha 1$ and $\alpha 2$ becomes 10.63 MHz.

As described above, according to the Embodiment 1, it becomes possible to reduce the noise propagated from the switching power source of the full bridge system to the electric power source, and realize the reduction in size and price of the circuit.

Embodiment 2

A switching power source 200 (not shown) in an Embodiment 2 differs from the switching power source 100 in the Embodiment 1 in the electrostatic capacitances CQ101 through CQ104 between the terminals of the switching elements. Hereinafter, the electrostatic capacitances CQ101 through CQ104 and frequencies of voltage ringings upon the turn off of each switching element in the Embodiment 2 will be described. Incidentally, a circuit configuration of the switching power source 200 is the same as that of the switching power source 100 in the Embodiment 1, and only the electrostatic capacitances CQ101 through CQ104, which combine the electrostatic capacitances of the capacitors C101 through C104 and the electrostatic capacitances of the switching elements themselves, respectively, are different. Therefore, FIG. 1 is used as a reference, and the description for the circuit configuration will be omitted.

In the Embodiment 2, it is set so that at least one value of electrostatic capacitance CQ101, CQ102, CQ103 and CQ104 is a first value, and the other value of the electrostatic capacitance is a second value different from the first value, i.e., values of the electrostatic capacitance take two types. In this case, the value of electrostatic capacitance of one switching element may be the first value and the value of electrostatic capacitance of the remaining three switching elements may be the second value, or the value of electrostatic capacitance of two switching elements may be the first value and the value of electrostatic capacitance of the remaining two switching elements may be the second value.

In addition, also in the Embodiment 2, the electrostatic capacitances between the drain terminal and the source terminal of the switching elements Q101 through Q104 themselves are substantially the same value. Therefore, a magnitude relationship among the electrostatic capacitances CQ101 through CQ104 depends on a magnitude relationship of the electrostatic capacitances of the capacitors C101 through C104. In the Embodiment 2, the value of electrostatic capacitance of two capacitors of the four capacitors are configured to be the first value, and the value of electrostatic capacitance of the remaining two capacitors are configured to be the second value. There is no limitation as to which two capacitors have the same electrostatic capacitance. In the Embodiment 2, for example, in the switching power source 200, the electrostatic capacitances of the capacitors C101 through C104 are set so as to have a relationship of the following equations and inequality (2).

$$C102 = C103 > C101 = C104 \tag{2}$$

The frequency of the voltage ringing which occurs upon each switching element being turned off is determined by the electrostatic capacitance of each capacitor as shown in Table 1. Therefore, in the switching power source 200 in which the electrostatic capacitance of each capacitor has the relationship of, for example, the equations and inequality (2), the frequency of the voltage ringing upon the switching element Q103 being turned off becomes equal to the frequency of the voltage ringing upon the switching element Q104 being turned off.

On the other hand, the frequency of the voltage ringing upon the turn off of the switching element Q101 and the frequency of the voltage ringing upon the turn off of the switching element Q102 are different from the frequency of the voltage ringing upon the turn off of the switching element Q103 or of the switching element Q104. In addition, the frequency of the voltage ringing upon the turn off of the switching element Q101 is also different from the frequency of the voltage ringing upon the turn off of the switching element Q102. Thus, in the Embodiment 2, a spectrum of noise propagating to the AC power source 10 has local maximum values at three frequencies. As an example, the frequencies of the voltage ringings when the electrostatic capacitances of the capacitor C101 and the capacitor C104 are 2200 pF, and the electrostatic capacitances of the capacitor C102 and the capacitor C103 are 4700 pF are shown in Table 3.

TABLE 3

| Switching element | Electrostatic capacitance of capacitor provided in parallel | Frequency of voltage ringing which occurs upon turn off |
|---|---|---|
| Q101 | 2200 pF | 12.5 MHz |
| Q102 | 4700 pF | 8.84 MHz |
| Q103 | 4700 pF | 10.1 MHz |
| Q104 | 2200 pF | 10.1 MHz |

When the switching element Q103 is turned off and when the switching element Q104 is turned off, the frequencies of the voltage ringings which occur become the same 10.1 MHz. On the other hand, the frequency of the voltage ringing which occurs when the switching element Q101 is turned off is 12.5 MHz, and the frequency of the voltage ringing which occurs when the switching element Q102 is turned off is 8.84 MHz. As such, when the electrostatic capacitances of the capacitors C101 through C104 are set so as to satisfy the relationship of the equations and inequality (2), the frequencies of the voltage ringings which occur take three different values. Since the frequencies of the voltage ringings upon the turn off of the switching elements do not have the same value for all of the switching elements, in the switching power source 200 compared to the typical switching power source of the full bridge system, peak intensities of the noise propagating to the AC power source become lower.

By the way, a reason why the electrostatic capacitances of the capacitors provided in parallel with the switching elements in the switching power source 200 are not four types but two types is for price reduction. Generally, in the switching power source of the full bridge system, current flowing through the capacitors provided in parallel with each switching element becomes larger as the output electric power of the switching power source gets larger. As an example, in the case in which the maximum output electric power is 1000 W or more, current flowing through the capacitors provided in parallel with each switching element have a large value as 0.5 Arms or more as an effective value and 5 A or more at maximum as an instantaneous value. Types of capacitor which have excellent frequency response and can flow a large current may be limited, and in addition, capacitors having electrostatic capacitance, which is not a value widely used, may also be expensive. Therefore, upon using the capacitors having many types of the electrostatic capacitances, a circuit may become expensive. On the other hand, since the capacitors required in the switching power source 200, excluding the smoothing capacitor C100, are only two types, it becomes possible to reduce the intensity of the noise propagating to the AC power source less expensive than the case using the capacitors having many types of the electrostatic capacitances.

Incidentally, as combinations of the electrostatic capacitances of the capacitor C101 through the capacitor C104, it is conceivable that the case constituted by four types of values (the Embodiment 1), a case constituted by three types of values, the case constituted by two types of values (the Embodiment 2) and a case constituted by one type of value. Of these, in all three cases except for the case constituted by one type of value, the noise propagating to the AC power source 10 can be reduced. Therefore, the electrostatic capacitances between the terminals of the switching elements need not necessarily be in the relationship described in the Embodiment 1 or in the Embodiment 2. Incidentally, in the case constituted by three types of values, it may be configured as follows. That is, it may be configured that, of the electrostatic capacitances CQ101, CQ102, CQ103 and CQ104, any two values of electrostatic capacitances are set to the first value, one value of electrostatic capacitance of the remaining two values is set to the second value different from the first value and the other value of the remaining two values is set to a third value different from the first value and the second value, respectively. In other words, it is sufficient to set so that, of the electrostatic capacitances between the drain terminal and the source terminal of the four switching elements, at least one electrostatic capacitance is different from the others.

As described above, according to the Embodiment 2, it becomes possible to reduce the noise propagated from the switching power source of the full bridge system to the electric power source, and realize the reduction in size and price of the circuit.

Embodiment 3

[Description of a Laser Beam Printer]

Figure 3:
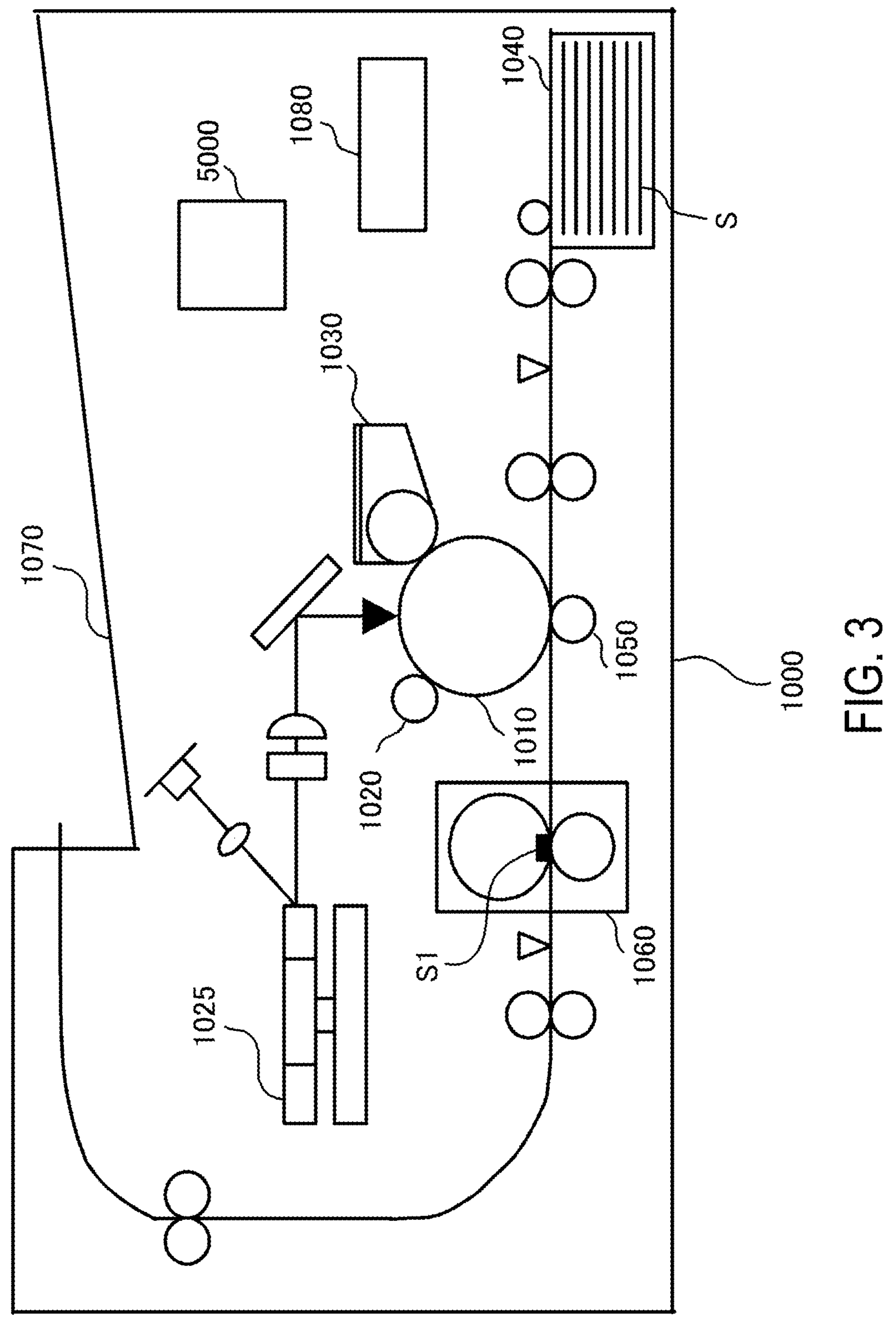
FIG. 3 is an outline configuration view of an image forming apparatus in the Embodiment 3.

In FIG. 3, as an example of an image forming apparatus, an outline configuration of a laser beam printer is shown. A laser beam printer 1000 (hereinafter, referred to as a printer 1000) is provided with a photosensitive drum 1010, a charging portion 1020 and a developing portion 1030. The photosensitive drum 1010 is an image bearing member on which an electrostatic latent image is formed. The charging portion 1020 uniformly charges the photosensitive drum 1010. An optical scanning device 1025, which is an exposure means, forms the electrostatic latent image by scanning a laser light corresponding to image data on the photosensitive drum 1010. The developing portion 1030 forms a toner image by developing the electrostatic latent image formed on the photosensitive drum 1010 with toner. The toner image formed on the photosensitive drum 1010 (on the image bearing member) is transferred by a transfer portion 1050 to a sheet S as a recording material fed from a cassette 1040, the unfixed toner image transferred to the sheet S is fixed by a fixing unit 1060, and the sheet S is discharged onto a tray 1070. The fixing unit 1060 includes the heated member S1. The heated member S1 is, for example, a heater, which fixes, by heating, the unfixed toner image transferred onto the sheet S.

This photosensitive drum 1010, the charging portion 1020, the developing portion 1030 and the transfer portion 1050 constitute an image forming portion. In addition, the printer 1000 is provided with a power source portion 1080, the power source portion 1080 includes the switching power source 100 or 200 described above, and the switching power source 100 or 200 supplies the electric power to the heated member S1.

A control portion 5000 includes a CPU (not shown) and controls an image forming operation by the image forming portion, temperature control of the heated member S1 which the fixing unit 1060 includes, a conveyance operation of the sheet S, etc. In other words, the control portion 5000 corresponds to the control portion 110 in FIG. 1. Incidentally, the control portion 5000 may be provided separately from the control portion 110. When the printer 1000 completes a print operation, after a predetermined time elapses, the printer 1000 transitions to a standby state, in which the print operation can be executed immediately.

After a further predetermined time elapses, in order to reduce power consumption during standby, the printer 1000 transitions from the standby state to a sleep state, which is a low electric power consumption mode. The printer 1000 has three states of the sleep mode and the standby state, which are a second mode, and a print state, which is a first mode, and the control portion 5000 transitions the printer to the respective states. Incidentally, the image forming apparatus to which the power source device of the present invention can be applied is not limited to the configuration exemplified in FIG. 3.

Incidentally, the switching power source 100 in the Embodiment 1 and the switching power source 200 in the Embodiment 2 can be applied as a power source for various types of members which consume electric power in the printer. Furthermore, the switching power source 100 in the Embodiment 1 and the switching power source 200 in the Embodiment 2 can also be applied to various types of devices, which require a power source and consume electric power, other than the printer.

As described above, also in the Embodiment 3, it becomes possible to reduce the noise propagated from the switching power source of the full bridge system to the electric power source, and realize the reduction in size and price of the circuit.

Disclosure of the present Embodiments includes the following constitutions.

Constitution 1

A power source device of a full bridge system comprising:
a rectifying circuit configured to rectify an AC voltage of an AC power source;
a smoothing capacitor connected to the rectifying circuit in parallel and configured to smooth the voltage rectified by the rectifying circuit;
a first switching element;
a second switching element connected to the first switching element in series;
a third switching element;
a fourth switching element connected to the third switching element in series;
an inductor element of which one end is connected to a connecting point of the first switching element and the second switching element and of which the other end is connected to a connecting point of the third switching element and the fourth switching element; and
a control portion configured to control a switching operation of the first switching element, the second switching element, the third switching element and the fourth switching element,
wherein the first switching element and the second switching element which are connected in series are connected to the smoothing capacitor in parallel, and the third switching element and the fourth switching element which are connected in series are connected to the smoothing capacitor in parallel, and
the power source device further comprising:
a first capacitor connected to the first switching element in parallel;
a second capacitor connected to the second switching element in parallel;
a third capacitor connected to the third switching element in parallel; and
a fourth capacitor connected to the fourth switching element in parallel,
wherein when a combined capacitance of an electrostatic capacitance between a drain terminal and a source terminal of the first switching element and an electrostatic capacitance of the first capacitor is defined as a first electrostatic capacitance, a combined capacitance of an electrostatic capacitance between a drain terminal and a source terminal of the second switching element and an electrostatic capacitance of the second capacitor is defined as a second electrostatic capacitance, a combined capacitance of an electrostatic capacitance between a drain terminal and a source terminal of the third switching element and an electrostatic capacitance of the third capacitor is defined as a third electrostatic capacitance, and a combined capacitance of an electrostatic capacitance between a drain terminal and a source terminal of the fourth switching element and an electrostatic capacitance of the fourth capacitor is defined as a fourth electrostatic capacitance,
at least one value of electrostatic capacitance of the first electrostatic capacitance, the second electrostatic capacitance, the third electrostatic capacitance and the fourth electrostatic capacitance is a value different from the other electrostatic capacitances.

Constitution 2

The power source device according to Constitution 1, wherein the electrostatic capacitances between the drain terminal and the source terminal of the first switching element, the second switching element, the third switching element and the fourth switching element are substantially the same.

Constitution 3

A power source device of a full bridge system comprising:
a rectifying circuit configured to rectify an AC voltage of an AC power source;
a smoothing capacitor connected to the rectifying circuit in parallel and configured to smooth the voltage rectified by the rectified circuit;
a first switching element;
a second switching element connected to the first switching element in series;
a third switching element;
a fourth switching element connected to the third switching element in series;
an inductor element of which one end is connected to a connecting point of the first switching element and the second switching element and of which the other end is connected to a connecting point of the third switching element and the fourth switching element; and
a control portion configured to control a switching operation of the first switching element, the second switching element, the third switching element and the fourth switching element,
wherein the first switching element and the second switching element which are connected in series are connected to the smoothing capacitor in parallel, and the third switching element and the fourth switching element which are connected in series are connected to the smoothing capacitor in parallel, and
wherein when an electrostatic capacitance between a drain terminal and a source terminal of the first switching element is defined as a first electrostatic capacitance,
an electrostatic capacitance between a drain terminal and a source terminal of the second switching element is defined as a second electrostatic capacitance, an electrostatic capacitance between a drain terminal and a source terminal of the third switching element is defined as a third electrostatic capacitance, and an electrostatic capacitance between a drain terminal and a source terminal of the fourth switching element is defined as a fourth electrostatic capacitance,
at least one value of electrostatic capacitance of the first electrostatic capacitance, the second electrostatic capacitance, the third electrostatic capacitance and the fourth electrostatic capacitance is a value different from those of the other electrostatic capacitances.

Constitution 4

The power source device according to any one of Constitution 1 to Constitution 3, wherein the first switching element, the second switching element, the third switching element and the fourth switching element are field effect transistors.

Constitution 5

The power source device according to any one of Constitution 1 to Constitution 4, wherein the first capacitor, the second capacitor, the third capacitor and the fourth capacitor are ceramic capacitors or film capacitors.

Constitution 6

The power source device according to any one of Constitution 1 to Constitution 5, wherein the first electrostatic capacitance, the second electrostatic capacitance, the third electrostatic capacitance and the fourth electrostatic capacitance are all different values.

Constitution 7

The power source device according to any one of Constitution 1 to Constitution 5, wherein at least one value of electrostatic capacitance of the first electrostatic capacitance, the second electrostatic capacitance, the third electrostatic capacitance and the fourth electrostatic capacitance is a first value, and the other value of the electrostatic capacitance is a second value different from the first value.

Constitution 8

The power source device according to any one of Constitution 1 to Constitution 5, wherein of the first electrostatic capacitance, the second electrostatic capacitance, the third electrostatic capacitance and the fourth electrostatic capacitance, any two values of electrostatic capacitances are a first value, one value of electrostatic capacitance of the remaining two values is a second value different from the first value and the other value of the electrostatic capacitance of the remaining two values is a third value different from the first value and the second value.

Constitution 9

An image forming apparatus for performing image formation on a recording material, the image forming apparatus comprising:

a power source device according to any one of Constitution 1 to Constitution 8.

Constitution 10

A device for consuming an electric power, the device comprising:

a power source device according to any one of Constitution 1 to Constitution 8.

According to the present invention, it becomes possible to reduce the noise propagated from the switching power source of the full bridge system to the electric power source, and realize the reduction in size and price of the circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-123753 filed on Jul. 30, 2024, which is hereby incorporated by reference herein in its entirety.

What is claimed is:

1. A power source device of a full bridge system comprising:

a rectifying circuit configured to rectify an AC voltage of an AC power source;

a smoothing capacitor connected to the rectifying circuit in parallel and configured to smooth the voltage rectified by the rectifying circuit;

a first switching element;

a second switching element connected to the first switching element in series;

a third switching element;

a fourth switching element connected to the third switching element in series;

an inductor element of which one end is connected to a connecting point of the first switching element and the second switching element and of which the other end is connected to a connecting point of the third switching element and the fourth switching element; and a control portion configured to control a switching operation of the first switching element, the second switching element, the third switching element and the fourth switching element, wherein the first switching element and the second switching element which are connected in series are connected to the smoothing capacitor in parallel, and the third switching element and the fourth switching element which are connected in series are connected to the smoothing capacitor in parallel, and the power source device further comprising:

a first capacitor connected to the first switching element in parallel;

a second capacitor connected to the second switching element in parallel;

a third capacitor connected to the third switching element in parallel; and a fourth capacitor connected to the fourth switching element in parallel, wherein when a combined capacitance of an electrostatic capacitance between a drain terminal and a source terminal of the first switching element and an electrostatic capacitance of the first capacitor is defined as a first electrostatic capacitance, a combined capacitance of an electrostatic capacitance between a drain terminal and a source terminal of the second switching element and an electrostatic capacitance of the second capacitor is defined as a second electrostatic capacitance, a combined capacitance of an electrostatic capacitance between a drain terminal and a source terminal of the third switching element and an electrostatic capacitance of the third capacitor is defined as a third electrostatic capacitance, and a combined capacitance of an electrostatic capacitance between a drain terminal and a source terminal of the fourth switching element and an electrostatic capacitance of the fourth capacitor is defined as a fourth electrostatic capacitance, at least one value of electrostatic capacitance of the first electrostatic capacitance, the second electrostatic capacitance, the third electrostatic capacitance and the fourth electrostatic capacitance is a value different from the other electrostatic capacitances.

2. The power source device according to claim 1, wherein the electrostatic capacitances between the drain terminal and the source terminal of the first switching element, the second switching element, the third switching element and the fourth switching element are substantially the same.

3. A power source device of a full bridge system comprising:

a rectifying circuit configured to rectify an AC voltage of an AC power source;

a smoothing capacitor connected to the rectifying circuit in parallel and configured to smooth the voltage rectified by the rectified circuit;

a first switching element;

a second switching element connected to the first switching element in series;

a third switching element;

a fourth switching element connected to the third switching element in series;

an inductor element of which one end is connected to a connecting point of the first switching element and the second switching element and of which the other end is connected to a connecting point of the third switching element and the fourth switching element; and a control portion configured to control a switching operation of the first switching element, the second switching element, the third switching element and the fourth switching element, wherein the first switching element and the second switching element which are connected in series are connected to the smoothing capacitor in parallel, and the third switching element and the fourth switching element which are connected in series are connected to the smoothing capacitor in parallel, and wherein when an electrostatic capacitance between a drain terminal and a source terminal of the first switching element is defined as a first electrostatic capacitance, an electrostatic capacitance between a drain terminal and a source terminal of the second switching element is defined as a second electrostatic capacitance, an electrostatic capacitance between a drain terminal and a source terminal of the third switching element is defined as a third electrostatic capacitance, and an electrostatic capacitance between a drain terminal and a source terminal of the fourth switching element is defined as a fourth electrostatic capacitance, at least one value of electrostatic capacitance of the first electrostatic capacitance, the second electrostatic capacitance, the third electrostatic capacitance and the fourth electrostatic capacitance is a value different from those of the other electrostatic capacitances.

4. The power source device according to claim 1, wherein the first switching element, the second switching element, the third switching element and the fourth switching element are field effect transistors.

5. The power source device according to claim 1, wherein the first capacitor, the second capacitor, the third capacitor and the fourth capacitor are ceramic capacitors or film capacitors.

6. The power source device according to claim 1, wherein the first electrostatic capacitance, the second electrostatic capacitance, the third electrostatic capacitance and the fourth electrostatic capacitance are all different values.

7. The power source device according to claim 1, wherein at least one value of electrostatic capacitance of the first electrostatic capacitance, the second electrostatic capacitance, the third electrostatic capacitance and the fourth electrostatic capacitance is a first value, and the other value of the electrostatic capacitance is a second value different from the first value.

8. The power source device according to claim 1, wherein of the first electrostatic capacitance, the second electrostatic capacitance, the third electrostatic capacitance and the fourth electrostatic capacitance, any two values of electrostatic capacitances are a first value, one value of electrostatic capacitance of the remaining two values is a second value different from the first value and the other value of the electrostatic capacitance of the remaining two values is a third value different from the first value and the second value.

9. An image forming apparatus for performing image formation on a recording material, the image forming apparatus comprising:

a power source device according to claim 1.

10. A device for consuming an electric power, the device comprising:

a power source device according to claim 1.

* * * * *